United States Patent
Pylkko

(10) Patent No.: US 7,567,818 B2
(45) Date of Patent: Jul. 28, 2009

(54) MOBILE DEVICE WITH WIDE-ANGLE OPTICS AND A RADIATION SENSOR

(75) Inventor: Heikki Pylkko, Oulu (FI)

(73) Assignee: MotionIP L.L.C., Morrisville, NC (US)

( * ) Notice: Subject to any disclaimer, the term of this patent is extended or adjusted under 35 U.S.C. 154(b) by 315 days.

(21) Appl. No.: 11/072,679

(22) Filed: Mar. 4, 2005

(65) Prior Publication Data

US 2005/0208978 A1 Sep. 22, 2005

(30) Foreign Application Priority Data

Mar. 16, 2004 (FI) ............................ 20045078

(51) Int. Cl.
*H04M 1/00* (2006.01)

(52) U.S. Cl. ............... 455/550.1; 455/67.11; 455/333; 455/344; 455/566

(58) Field of Classification Search .......... 455/566, 455/556.1, 556.2, 550.1, 414.1, 414.2, 486.1, 455/456.6, 457, 557, 575.1, 90.3, 333, 344, 455/347, 115.1, 115.4, 67.11; 349/156, 188; 345/156–159, 161–169, 175, 184; 382/312–313, 382/315

See application file for complete search history.

(56) References Cited

U.S. PATENT DOCUMENTS

| | | | | |
|---|---|---|---|---|
| 6,201,554 B1 * | 3/2001 | Lands | ........................ | 345/169 |
| 6,375,572 B1 * | 4/2002 | Masuyama et al. | ............ | 463/43 |
| 6,466,198 B1 * | 10/2002 | Feinstein | .................... | 345/158 |
| 6,552,713 B1 * | 4/2003 | Van Brocklin et al. | ...... | 345/157 |
| 6,624,824 B1 * | 9/2003 | Tognazzini et al. | ......... | 345/684 |
| 6,690,358 B2 * | 2/2004 | Kaplan | ........................ | 345/158 |
| 6,765,553 B1 * | 7/2004 | Odamura | .................... | 345/156 |
| 6,797,937 B2 * | 9/2004 | Norskog et al. | ............. | 250/221 |
| 6,872,931 B2 * | 3/2005 | Liess et al. | .................. | 250/221 |
| 6,933,923 B2 * | 8/2005 | Feinstein | .................... | 345/158 |
| 6,939,231 B2 * | 9/2005 | Mantyjarvi et al. | ........... | 463/30 |
| 6,977,675 B2 * | 12/2005 | Kotzin | ...................... | 348/208.2 |
| 7,058,432 B2 * | 6/2006 | Nishimoto | ............... | 455/575.1 |
| 7,138,979 B2 * | 11/2006 | Robin et al. | ................. | 345/158 |
| 7,164,411 B2 * | 1/2007 | Keranen et al. | ............. | 345/156 |
| 7,184,025 B2 * | 2/2007 | Williams et al. | ............ | 345/169 |
| 7,194,816 B2 * | 3/2007 | Tamura | ..................... | 33/355 R |
| 7,242,391 B2 | 7/2007 | Lin et al. | | |

(Continued)

FOREIGN PATENT DOCUMENTS

EP    1 241 616 A2    9/2002

(Continued)

*Primary Examiner*—Pablo N Tran
(74) *Attorney, Agent, or Firm*—Cohen Pontani Lieberman & Pavane LLP

(57) ABSTRACT

The invention comprises a mobile device controlled by moving it, for example, by tilting. The mobile device is equipped with wide-angle optics and with a radiation sensor detecting either visible light or infrared radiation. The wide-angle optics may be directed towards the user, whereupon the radiation sensor receives useful images through the wide-angle optics. The images include contrast or thermal differences which it make possible to determine in which way the user has moved the mobile device. In more detail, a tilt angle or a corresponding change can be calculated and then, on the basis of the change, the content shown on a display of the mobile device is altered. The content is, for example, a menu or a web page.

11 Claims, 4 Drawing Sheets

U.S. PATENT DOCUMENTS

| | | | | |
|---|---|---|---|---|
| 7,289,102 B2* | 10/2007 | Hinckley et al. | ............ | 345/156 |
| 7,301,528 B2* | 11/2007 | Marvit et al. | ............... | 345/156 |
| 2002/0052209 A1* | 5/2002 | Frohlund | .................... | 455/456 |
| 2004/0196259 A1* | 10/2004 | Bradski | ...................... | 345/158 |
| 2004/0204067 A1* | 10/2004 | Kurakane | ................ | 455/556.1 |
| 2006/0146009 A1* | 7/2006 | Syrbe et al. | ................. | 345/156 |

FOREIGN PATENT DOCUMENTS

| | | |
|---|---|---|
| GB | 2 358 336 A | 7/2001 |
| TW | 544637 | 12/1999 |
| WO | WO 01/86920 | 11/2001 |
| WO | WO 02/35459 A1 | 5/2002 |

\* cited by examiner

MOBILE DEVICE WITH WIDE-ANGLE OPTICS AND A RADIATION SENSOR

BACKGROUND OF THE INVENTION

1. Field of the Invention

The present invention relates generally to mobile devices such as mobile phones and controlling techniques for mobile devices. In more detail, the invention relates to controlling techniques whereby a user controls a mobile device by moving it.

2. Description of the Related Art

Over the past few years a number of techniques have been developed to obtain and utilize motion information about a mobile device. One of these techniques is based on the use of accelerometers, when a mobile device is equipped with at least one accelerometer that continuously measures the motion of the mobile device. The mobile device estimates on the basis of the measurement results which way a user has tilted the mobile device. For example, the mobile device may calculate the difference in the tilt angle of the current position in comparison to the previous position of the mobile device. Thereafter a certain action is performed on the basis of the tilt angle. For example, if the mobile device presents menu options, the menu options can be scrolled forward or backward according to the tilt angle.

FIG. 1A shows a mobile phone presenting a menu before a tilt. We may assume that the mobile phone 101 is equipped with an accelerometer. The mobile phone 101 presents a menu 102 on its display 103 and said menu contains three options. The options are the names of people whom a user can call by selecting one of the options. At the moment the middle option 104 is highlighted, i.e. the user can select it, for example, by pressing a certain button.

FIG. 1B shows the mobile phone 101 presenting the menu 102 when the user has tilted it to a new position. In more detail, the user has tilted the mobile phone so that the upper edge 105 is now farther away from the user than in the FIG. 1A. The tilt angle from the position of the mobile phone shown in FIG. 1A to the new position is approximately −20 degrees 106. Because of the tilt, the upper option 107 of the menu 102 is now highlighted. Correspondingly, if the user tilts the mobile phone from the position shown in FIG. 1A to another new position so that the upper edge 105 of the mobile phone is closer to the user, the lower option 108 will be highlighted.

FIG. 1C shows the content of the menu 102 after a rapid tilt. The intensive tilt is not necessarily related to the magnitude of the tilt angle, but to how quickly the new position of the mobile phone is achieved. Now the menu options are scrolled so that the menu includes a new menu option 109. Thus, the menu 102 is scrolled forward. Correspondingly, if the user tilts the upper edge 105 of the mobile phone 101 rapidly closer to himself/herself, the menu is scrolled backward.

FIGS. 1B and 1C show examples of received motion information about a mobile device. The said motion information indicates "a longitudinal tilt" of the mobile device.

The motion information may also indicate that the user has tilted the right edge 108 of the mobile phone 101 either farther from himself/herself or closer to himself/herself. This is termed "a horizontal tilt".

A mobile device can be adapted to detect the longitudinal and/or horizontal tilt of the mobile device and to then scroll longitudinally and/or horizontally the content shown on its display. This is a very useful feature, for example, when browsing web pages. The feature makes it possible to browse even large and complicated web pages with a relatively small-sized display.

In prior art, the motion information of a mobile/portable device can be obtained using one or more accelerometers. Accelerometers are relatively inexpensive and reliable. Alternatively, the said motion information can be obtained using inclinometers or gyroscopes. Also "optical navigation" can be used to control devices. Especially Agilent Technologies has developed the last-mentioned technique.

FIG. 2 shows a portable electronic device equipped with mouse-like capabilities. The device 201 includes a display 202 and a motion sensor 203. The display shows the same menu as in FIG. 1A and the middle option 204 is currently highlighted. When a user moves his/her finger 205 upwards 206, the upper option 207 is highlighted. The user must press the finger 205 against the motion sensor 203, or keep the finger very close to it, to be able to control the device 201. The operation of the optical navigation is in general based on sequential images received by the motion sensor and the comparative difference in luminance between the said images. The optical navigation and the motion sensor 203 are further described in EP1241616.

The prior art has certain drawbacks. Accelerometers and inclinometers are sensitive to vibration. Therefore a portable device equipped with an accelerometer or an inclinometer may be difficult to control inside of a moving car or when walking. Said device has also rather limited operating positions. Gyroscopes do not suffer from vibration, but they do suffer from so-called drift. In addition, gyroscopes are mechanically complicated and thus expensive devices.

Also the known implementations of optical navigation suffer from vibration. Another drawback with these implementations is that a user must use both hands, i.e. the user holds the mobile/portable device in one hand and controls said device with a finger of the other hand. For example, in the device 101 the display 103 is large-sized, almost covering the whole front surface of the device 101. If a motion sensor is plugged into the front surface of the device 101, the user's hand will at least partially cover the display.

Thus, the drawbacks related to the prior art optical navigation and mobile/portable devices are: 1) the user needs both hands for using a mobile/portable device and 2) the user's hand may partially cover the display of said device.

SUMMARY OF THE INVENTION

The main objective of the invention is to solve the drawbacks of the prior art. Another objective of the invention is to provide an alternative way to control mobile/portable devices.

One characteristic of the invention is that the user can only needs one hand to operate a mobile device equipped with a large-sized display.

Another characteristic of the invention is the exploitation of wide-angle optics and a radiation sensor.

Still another characteristic of the invention is that the wide-angle optics are preferably directed towards the user, whereupon the radiation sensor receives very useful images through the wide-angle optics. These images include such illuminance or thermal differences which it possible to determine in which direction the user has tilted/moved the mobile device.

Still another characteristic of the invention is that an inventive mobile device is adapted to detect a change between its current and its new position. The change may be a tilt, but it also may be another type of changes between the mobile device's previous and new position, wherein the previous and the new position may be angles or locations.

The inventive mobile device includes the wide-angle optics and the radiation sensor. In addition, said mobile device is equipped with at least a memory, a processor, and a display for showing the content. The content is, for example, web pages or menus. Said mobile device is adapted to receive at least two images through the wide-angle optics and the radiation sensor to the memory, wherein the first image indicates the first position of the mobile device at the first point in time and a second image indicates a second position of the mobile device at a second point in time. Said mobile device is further adapted to: determine the change from the first position and the second position of the mobile device by applying a method of motion detection to the first image and the second image, and alter the content shown on the display in accordance with the determined change. There are at least two different types of motion detection methods which can be applied to the determination of the change. Basically, the said change is initiated by moving the mobile device, for example, by tilting or rotating it. Different types of changes may affect in the same way or differently the mobile device and the content shown on its display.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is described more closely with reference to the accompanying drawings, in which.

DETAILED DESCRIPTION OF THE PRESENTLY PREFERRED EMBODIMENTS

The invention comprises a mobile (or portable) device which may be, for example, a mobile phone, a personal digital assistant (PDA), a digital camera, a music player, or a game device.

Figure 3:
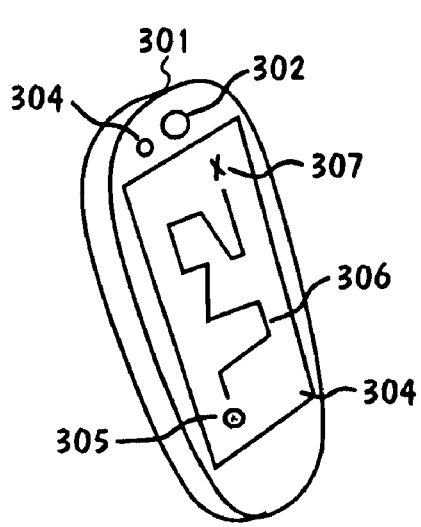
FIG. 3 shows the inventive mobile device.

FIG. 3 shows a mobile device equipped with wide-angle optics and a radiation sensor. The mobile device 301 resembles the prior art mobile phone 101. The main difference is the wide-angle optics, i.e a wide-angle lens 302 placed on the surface of the mobile device 301. The wide-angle lens is preferably placed on the same side of the mobile device as the display 303 of the mobile device, i.e. the lens 302 is directed towards the user. The mobile device may further include an illumination source 304 for creating contrast for images. If the lens 302 is not located on the display side of the mobile device 301, the images received through the lens may be dark or otherwise poor quality. If the user's hand or another object is covering the lens, all the images will be dark and therefore useless for controlling the content shown on the display 303.

In FIG. 3 the content shown on the display of the mobile device 301 relates to an electronic game whereby the user tries to move a ball 305 via a route 306 to a goal 307 by properly tilting the mobile device 301. Generally speaking, the content may relate to menus, web pages, games, email, or other applications, for example.

An inventive mobile device can be adapted to detect a change between its current angle/location and its new angle/location. Therefore it detects, for example, longitudinal tilts, horizontal tilts, or simultaneously longitudinal and horizontal tilts.

Figure 4:
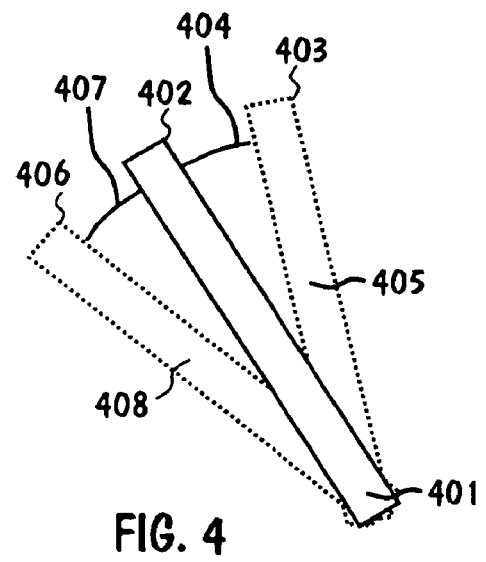
FIG. 4 shows two examples of longitudinal tilts.

FIG. 4 shows two examples of longitudinal tilts when a mobile device such as mobile device 301 is observed from the side. The mobile device is initially located in position 401. If the upper edge 402 of the mobile device is raised so that the upper edge is located at point 403, the tilt angle 404 between the original position 401 of the mobile device and its new position 405 is approximately +15 degrees. Correspondingly, if the upper edge 402 of the mobile device is lowered so that the upper edge 402 is located at point 406, the tilt angle 407 between the original position 401 of the mobile device and its new position 408 is approximately −15 degrees.

As can be seen on the basis of FIG. 4, in a longitudinal tilt the upper edge of a mobile device moves in relation to the bottom edge of the mobile device. Correspondingly, in a horizontal tilt the right edge of a mobile device moves in relation to the left edge of the mobile device.

Figure 2:
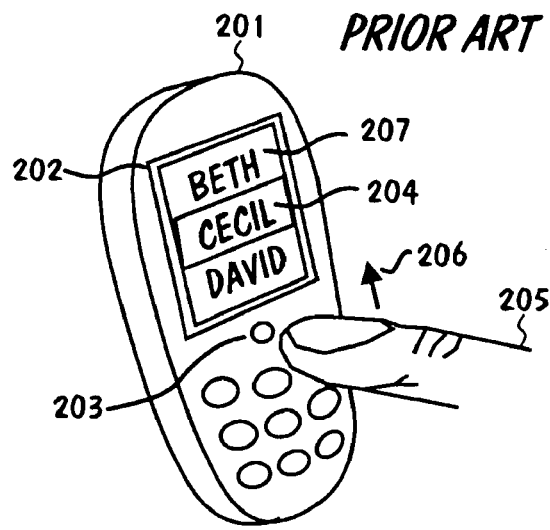
FIG. 2 shows a portable electronic device with mouse-like capabilities.

The radiation sensor used in the inventive mobile device may be a navigation chip. For example, the portable device shown in FIG. 2 utilizes the navigation chip, but as mentioned above, a user normally needs his/her both hands when using the device 201. The inventive mobile device does not have this drawback, i.e. the user needs just one hand to use the inventive mobile device.

Figure 5:
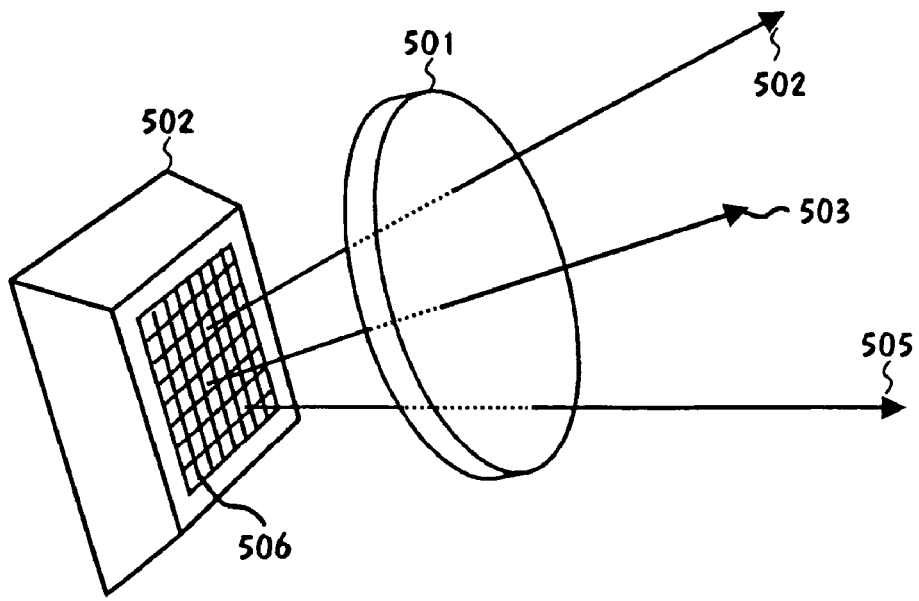
FIG. 5 illustrates the use of a wide-angle lens and a navigation chip.

FIG. 5 illustrates the use of a wide-angle lens and a navigation chip. Both of them are for detecting radiation information, which is either visible light or infrared radiation. A wide-angle lens 501 is a very useful component in the inventive mobile device. Due to the wide-angle lens 501, the navigation chip 502 can receive radiation rays 503, 504, and 505 from a relatively large area outside of the device into which the lens 501 and the chip 502 are inserted. Let us assume that both of the lens and the chip are inserted into the mobile device 301 and that the chip 502 contains an 8×8 pixel array 506. The radiation rays such as 503, 504, and 505 are imaged on the pixel array 506. Therefore each image used by the mobile device 301 is composed of 8×8, or 64 pixels. The mobile device 301 receives at least 25 images per second through the lens 501 and the chip 502.

The inventive mobile device preferably uses a pixel array that is composed of more than 64 pixels. If the pixel array contains less than 64 pixels a user must tilt the mobile device a great deal in order to affect it.

Figure 6:
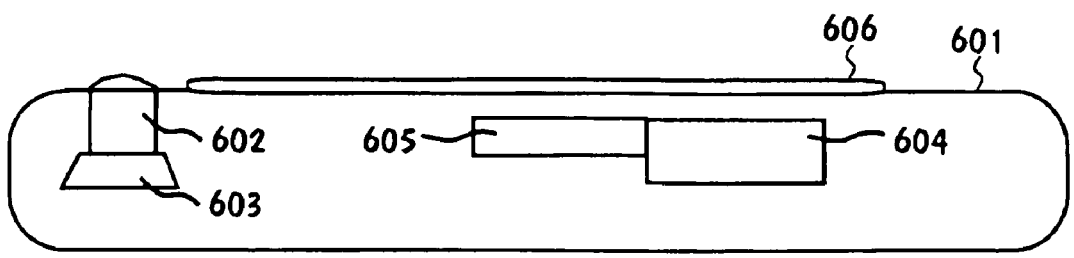
FIG. 6 shows a cross-section of the inventive mobile device.

FIG. 6 shows a cross section of the inventive mobile device. This mobile device 601 includes wide-angle optics 602 and a radiation sensor 603, and it is equipped with at least a memory 604, a processor 605, and a display 606 for showing content. The mobile device 601 is adapted to receive at least two images through the wide-angle optics 602 and the sensor 603, and store the images in the memory 604, wherein the first image indicates the first position of the mobile device at the first point in time and a second image indicates a second position of the mobile device at a second point in time. The processor 605 of the mobile device 601 is adapted to handle at least 25 images per second. Thus, the time interval between the first and second image is at most 40 milliseconds. The mobile device 601 is further adapted to determine the change between the first position and the second position of the mobile device by applying a motion detection method to the first image and the second image, and the mobile device is adapted to alter the content shown on the display in accordance with said change. The change between the first position and the second position of the mobile device means that the angle and/or the location of the mobile device have been changed. Tilting is a basic example of changing the angle of the mobile device. In that case, the change between the first position and the second position of the mobile device is actually a tilt angle of the mobile device. For example, a user lowers the left or right edge of the mobile device. In addition to tilting, the mobile device according to the invention can be controlled by moving it from one location to another. For example, the user can move the mobile device to the left, or the right in relation to himself/herself. Tilting the left edge of the mobile device may or may not result in the same effect as moving the mobile device to the left of the user. The mobile device cannot necessarily distinguish these two different types of motions from each other, because both of them result in very similar changes in the image information stored in the navigation chip 502 or a corresponding device. In order to apply the motion detection method, the mobile device 601 is further adapted to: 1a) superimpose the first image and the second image, 1b) calculate the best-fit offset from the first image to the second image, 1c) calculate on the basis of the best-fit offset for the change between the first position and the second position of the mobile device. Alternatively, in order to apply the motion detection method the mobile device 601 is adapted to: 2a) search a location of a predetermined pattern in the first image and in the second image, 2b) calculate the offset between the location of said pattern in the first image and in the second image, and 2c) calculate the change on the basis of the offset.

The mobile device 601 may use similar optical navigation as in prior art. However, the radiation may be infrared radiation, instead of visible light. Therefore the terms "optical navigation" and "wide-angle optics" should be understood more broadly than in prior art. With regard to this we will describe in more detail the mobile device 601 and its parts.

The mobile device 601 may include an illumination source 304, if the first image and the second image handled by the mobile device are a set of luminosity values. But, if the first image and the second image are a set of thermal values, there is no need for said illumination source.

The contrast or thermal differences between sequential images (the first and the second image) are essential, because the determination concerning the change of the mobile device 601 is based on these contrast or thermal differences.

The wide-angle optics 602 are adapted to receive radiation. They may or may not include the wide-angle lens 501. Instead of the lens 501, the wide-angle optics may include a slit that is similar to the slit of a needle-eye camera. Then the wide-angle optics 602 preferably includes a light intensifier, which is also termed "light magnifier" or "light amplifier".

The wide-angle optics 602 may also include a light filter or some other filter which filtering a certain wavelength/wavelengths out of the radiation received by the wide-angle optics.

The radiation sensor 603 is adapted to convert the radiation received through the wide-angle optics 602 into an electronic signal. Generally, the radiation sensor is an array composed of radiation detectors. It may be, for example, the navigation chip 502 or a photomultiplier.

Next we will describe a motion detection method which is based on the calculation of the best-fit offset between the images. Optical navigation developed by Agilent Technologies is one example of this type of method. Let us assume that the images are luminosity values.

Figure 7A:
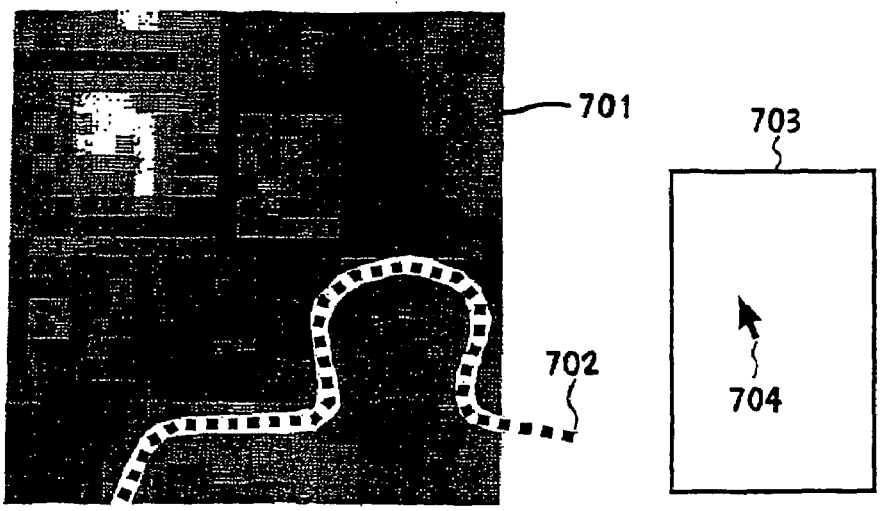
FIG. 7A shows a cursor and a corresponding image before a tilt.

FIG. 7A shows a cursor and a corresponding image before a tilt. We may assume that the mobile device 601 shows the said cursor on its display. The image 701 is composed of 24×24, or 576 pixels. Each of these pixels includes a luminosity value. For example, each optical piece of information 503, 504, and 505 may be a luminosity value, and those values are imaged on a pixel array composed of said 576 pixels. A dashed line 702 illustrating the user's position in the image 701 is added to the image. In other words, the real image 701 received through the wide-angle optics 602 does not include the dashed line 702. Before the tilt the user sees a display 703 and the cursor 704. The other possible content is omitted from the display 703.

Figure 7B:
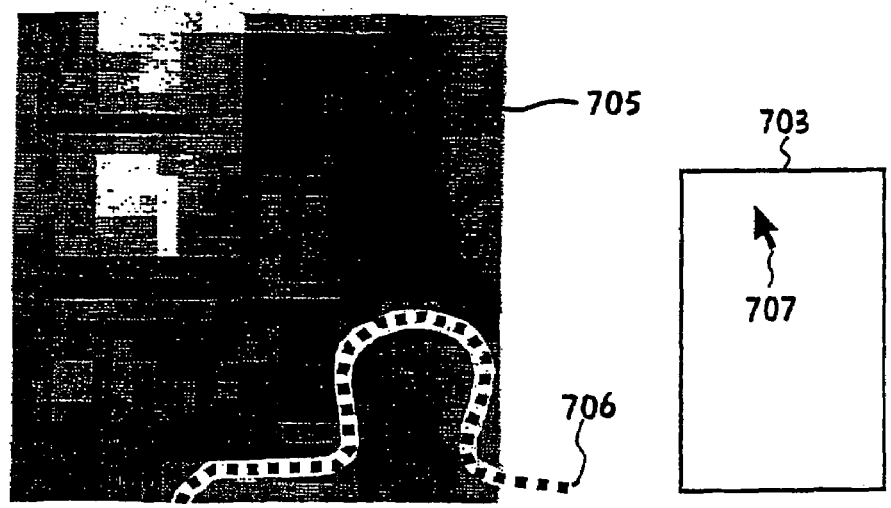
FIG. 7B shows the same cursor and a new image after the tilt.

FIG. 7B shows the same cursor and a new image after the tilt. Also the new image 705 is composed of 576 pixels, each of them including a luminosity value. The dashed line 706 illustrates the user's new position in the Figure as received through the wide-angle optics, more specifically the position of the user's head and right shoulder. When comparing the dashed line 706 to the dashed line 702 shown in FIG. 7A, it can be noticed that the user's position in FIG. 7B is lower than in FIG. 7A. In addition, the user's position has moved slightly to the right. We can calculate the motion of the user on the basis of the pixels. The result is that the position of the user has moved three pixels downward and one pixel to the right. The new position 707 of the cursor 704 on the display 703 is in accordance with this calculation.

The calculation may be based on pattern recognition, whereby the shape of a user (the dashed lines 702 and 706) is an appropriate choice as the pattern to be searched from sequential images. However, we assume that the calculation concerns a best-fit offset between the sequential images.

Figure 7C:
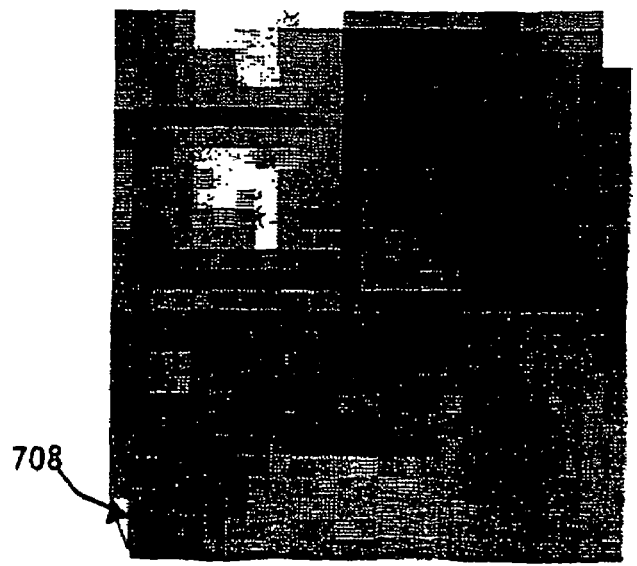
FIG. 7C shows the best-fit offset between the two images.

FIG. 7C shows a best-fit offset between the images 701 and 705. These images are superimposed so that the luminosity values of the pixels of the image 705 correspond as precisely as possible to the luminosity values of the pixels of the image 701. There is the best match between the luminosity values when the image 701 is superimposed on the image 705 as shown in FIG. 7C. This is a simplified example of the calculation of the best-fit offset 708 between the first image (shown in FIG. 7A) and the second image (shown in 7B). A person skilled in the art can find detailed descriptions of the calculation of the best-fit offset, for example, by using terms the "best-fit offset" and/or "optical navigation" in Internet searches.

When the images 701 and 705 are superimposed on the memory of a certain mobile device and said mobile device has calculated the best-fit offset between the images, the next operation is the determination of the tilt angle. The mobile device determines the tilt angle between the first position and the second position of the mobile device on the basis of the best-fit offset. This determination may be based on the following: the longer the offset the greater the tilt angle. We may assume that the longitudinal tilt of the mobile device is more important than the horizontal tilt and for that reason the mobile device determines at least the longitudinal tilt. When deemed useful, the mobile device may also determinate the horizontal tilt.

Lastly, the mobile device alters the content shown on its display in accordance with the tilt angle/angles. The mobile device may move a cursor to another position as shown in FIG. 7B. Alternatively, the mobile device may alter the content of a menu as shown in FIG. 1B, for example. Another alternative, relating to FIG. 3 is that the mobile device updates the position of the ball 305 on the route 306. These are just some examples of how the content of the display is altered.

Figure 8:
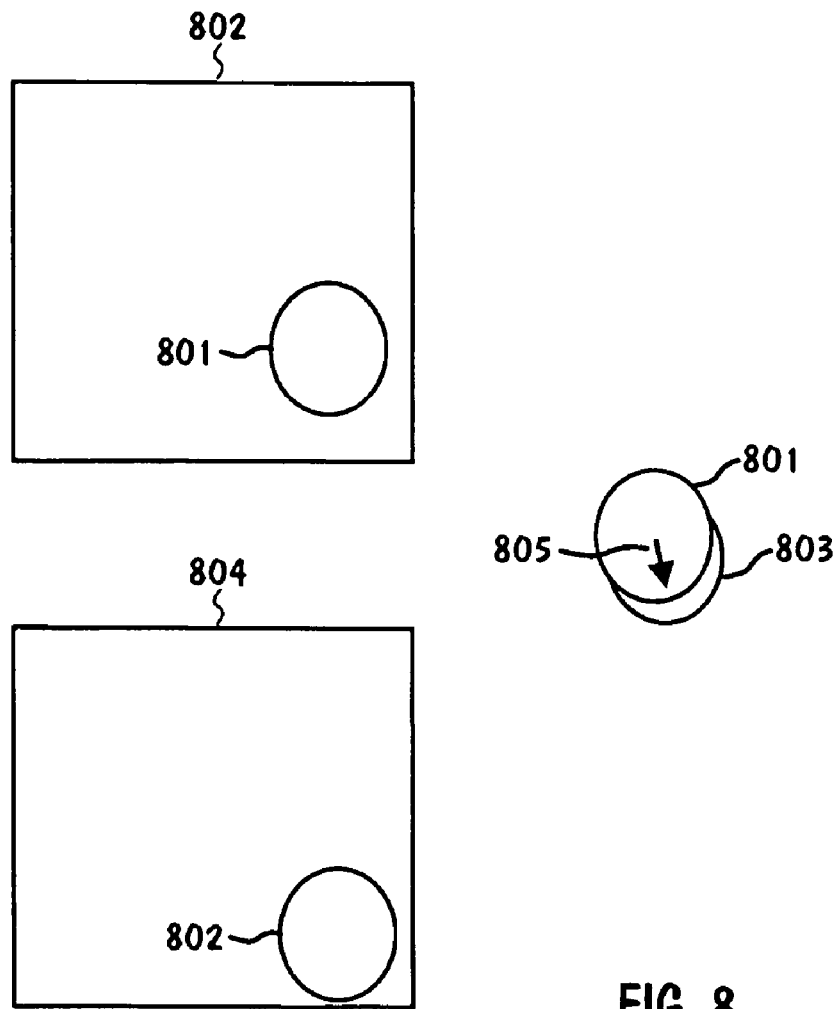
FIG. 8 illustrates a method of pattern-based motion detection.

FIG. 8 illustrates the motion detection method based on the search for a predetermined pattern in the images, such as the first and the second image mentioned in FIG. 6. Let us assume that the images are thermal values. But, they could just as well be luminosity values. Let us assume that the predetermined pattern is an ellipse and the temperature of the ellipse is about 37 degrees in Celsius. The ellipse describes the face of a user. The user and his/her surroundings are the same as in FIG. 7A, but the surroundings are omitted from FIG. 8. The mobile device 601 searches the location 801 of the ellipse in the first image 802 and the location 803 of the ellipse in the second image 804. The mobile device calculates an offset 805 between the locations 801 and 803 of the ellipse. Finally, it calculates the tilt angle of the mobile device or another type of change on the basis of the offset. A person skilled in the art can find detailed descriptions of this method, for example, by using the search word "pattern recognition" in the Internet searches.

The mobile device, such as a mobile phone or a personal digital assistant (PDA), may include a digital video camera. In this case the wide-angle optics 602 and the radiation sensor 603 may be parts of the said digital video camera. Nowadays many mobile phones include a digital camera, and in the future some mobile phone models may include a digital video camera.

If a mobile device includes a digital video camera, the digital video camera can be used for controlling the mobile device. Correspondingly, if the mobile device is a digital video camera, said camera can be utilized according to the invention, instead of separated wide-angle optics and a separated radiation sensor.

As mentioned above, the mobile device (shown in FIG. 6) is adapted to determine the change and in response to the change to alter the content shown on its display. The mobile device 601 may be further adapted to determine another type change information and alter the content shown on the display in accordance with the other change.

Figure 1A:
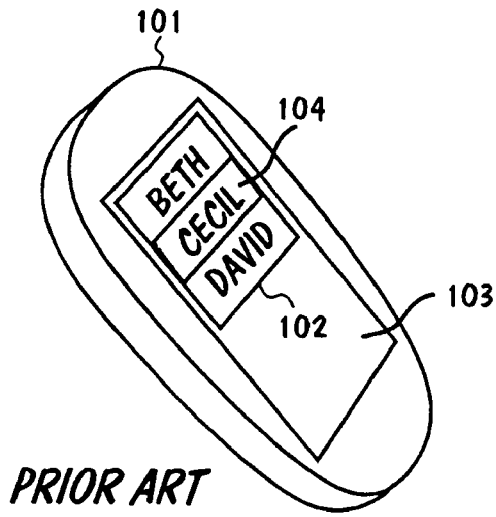
FIG. 1A shows a mobile phone presenting a menu before a tilt.
Figure 1B:
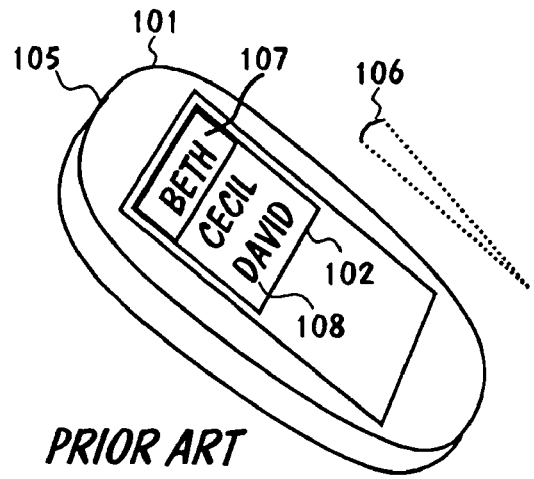
FIG. 1B shows the mobile phone presenting the menu after the tilt.
Figure 1C:
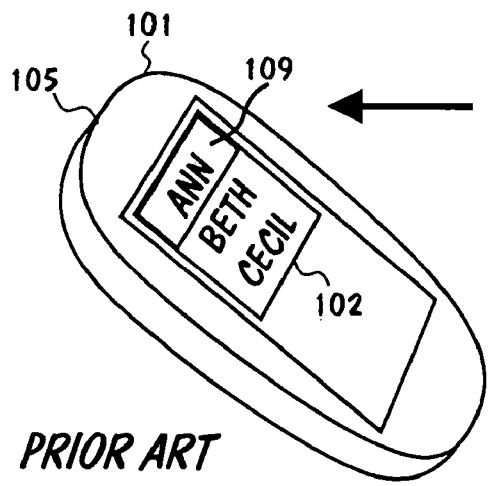
FIG. 1C shows the content of the menu after an intensive tilt.

When the mobile device alters the content of its display, it may perform a certain operation, such as the menu operations shown in FIGS. 1A, 1B, and 1C. In addition to these menu operations, an operation set of the mobile device 601 may also include other types of operations. If the mobile device 601 always responds to the tilt angles one by one, the number of different operations in the operation set of the mobile device is quite limited. In order to enlarge the operation set, the mobile device can be adapted to detect sets of tilt angles. In this case, the mobile device determines that two tilt angles belong to the same set, if the tilt angle of the mobile device changes twice during a certain time period. This way the mobile device can determine, for example, that a user is rotating said mobile device. The user can rotate the mobile device in a clockwise or a counter-clockwise direction. These two directions can be mapped to "zoom in" and "zoom out" operations, for example.

Figure 9:
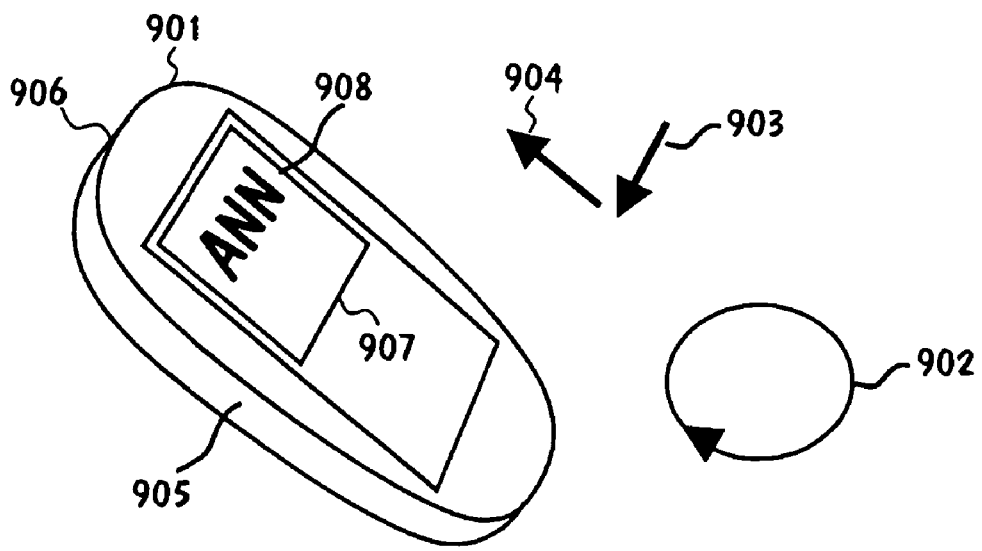
FIG. 9 illustrates "zoom in" and "zoom out" operations.

FIG. 9 illustrates the zoom in and the zoom out operations. A user has rotated the mobile device 901 in the clockwise direction 902. The mobile device 901 determines the rotation on the basis of at least two changes when these transactions happen within a predetermined time limit. There are three ways to rotate the mobile device in the clockwise direction 902 or in the counter-clockwise direction. First, a user can rotate the mobile device 901 by moving it to the left 903 of himself/herself and then away 904 from himself/herself. The motion may continue after the changes 903 and 904, but the mobile device can be adapted to determine on the basis of these two changes that it has been moved to the clockwise direction. Secondly, the user can rotate the mobile device 901 by tilting its edges in a certain order, for example: first the left edge 905, then the upper edge 906, then the right edge, and lastly the lower edge. Also in that case two changes may be enough for determining the clockwise direction 902. Thirdly, the user can rotate the mobile device 901 by turning it around an imaginary axis which is perpendicular to the display 907 of the mobile device. It may be enough that the user turns the mobile device less than one-fourth of the full circle. Thus, there are three ways to cause the clockwise rotation direction 902 for the mobile device. In response to the clockwise rotation direction 902, the mobile device 901 may zoom in the content shown on the display 907 of the mobile device. In this example, the content is the simple text "Ann" 908. If the user rotates the mobile device in a counter-clockwise direction, the mobile device may zoom out the text "Ann", i.e. making it smaller in size.

If required, the mobile device 601 shown in FIG. 6 can detect sets of changes, wherein a certain set of changes is mapped to a certain operation. Therefore, when the change between the first position and the second position meets the first predefined criterion at a certain point in time and when the other change between the first position and the second position meets a second predefined criterion within a predetermined time period starting from that certain point in time, the mobile device 601 is further adapted to perform a predetermined operation on the display of the mobile device. The predefined operation may be, for example, to zoom in or to zoom out the content shown on the display.

In addition to the examples and the implementation alternatives described above, there are other examples and implementation alternatives which a person skilled in the art can find and utilize by using the teachings of this patent application.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A mobile device comprising:
a memory,
a processor,
a display for showing content,
wide-angle optics, and
a navigation chip having a radiation sensor for detecting positions of the mobile device, the wide angle optics being disposed in front of the navigation chip and configured such that the navigation chip receives, through the wide angle optics, radiation from a large area outside of the mobile device,
the mobile device being adapted to receive at least first and second images through the wide-angle lens and the navigation chip, wherein the first image indicates a first position of the mobile device at a first point in time and the second image indicates a second position of the mobile device at a second point in time, to store the first and second images as sets of luminosity values in the memory, to determine a change between the first position and the second position of the mobile device by applying a motion detection method to the first image and the second image, and to alter the content shown on the display in accordance with the determined change,
wherein the motion detection method comprises superimposing the first image and the second image, calculating a best-fit offset between the first image and the second image, and calculating the change on the basis of the best-fit offset.

2. The mobile device as in claim 1, wherein the mobile device is further adapted to determine another change between the first position and second position of the mobile device by applying the motion detection method and to alter the content shown on the display in accordance with the other change.

3. The mobile device as in claim 2, wherein when the determined change between the first position and the second position meets a first predefined criterion of a certain point in time and when the other change between the first position and the second position meets a second predefined criterion within a predetermined time period starting from the certain point in time, the mobile device is further adapted to perform a predetermined operation on the display of the mobile device.

4. The mobile device as in claim 3, wherein the predetermined operation is one of a zoom in on the content shown on the display or a zoom out on the content shown on the display.

5. The mobile device as in claim 3, wherein the predetermined operation performed on the display is one of move a cursor, close a menu, open a menu, and select a menu option.

6. The mobile device as in claim 1, wherein the mobile device is one of a mobile phone, a personal digital assistant (PDA), a digital camera, a music player, and a game device.

7. The mobile device as in claim 1, wherein the wide-angle optics is arranged on the same side of the mobile device as the display, whereby the wide-angle optics face the user during operation of the device.

8. The mobile device as in claim 1, wherein the radiation sensor comprises a pixel array not greater than 24×24.

9. The mobile device as in claim 1, wherein the navigation chip is separate from the processor and configured to implement at least a portion of the motion detection method.

10. A mobile device comprising:
a memory,
a processor,
a display for showing content,
wide-angle optics, and
a navigation chip having a radiation sensor for detecting positions of the mobile device,
the mobile device being adapted to receive at least first and second images through the wide-angle lens and the navigation chip, wherein the first image indicates a first position of the mobile device at a first point in time and the second image indicates a second position of the mobile device at a second point in time, to store the first and second images as sets of luminosity values in the memory, to determine a change between the first position and the second position of the mobile device by applying a motion detection method comprising superimposing the first image and the second image, calculating a best-fit offset between the first image and the second image, and calculating the change on the basis of the best-fit offset,
the mobile device being configured to alter the content of the display as follows:
when the mobile device determines, by the motion detection method, a single change between the first position and the second position, the mobile device alters the content of the display by moving a cursor in accordance with the single change, and
when the mobile device determines, by the motion detection method, two successive changes in position including first and second changes in position of the mobile device, wherein the first change meets a first predetermined criterion at a third point in time and the second change meets a second predetermined criterion within a predetermined time period starting from the third point in time, the mobile device alters the content of the display by performing one of zooming in the content, zooming out the content, closing a menu, opening a menu, and selecting a menu option.

11. A mobile device comprising:
a memory,
a processor,
a display for showing content,
wide-angle optics, and
a navigation chip having a radiation sensor for detecting positions of the mobile device,
the mobile device being adapted to receive at least first and second images through the wide-angle lens and the navigation chip, wherein the first image indicates a first position of the mobile device at a first point in time and the second image indicates a second position of the mobile device at a second point in time, to store the first and second images as sets of luminosity values in the memory, to determine a change between the first position and the second position of the mobile device by applying a motion detection method comprising superimposing the first image and the second image, calculating a best-fit offset between the first image and the second image, and calculating the change on the basis of the best-fit offset,
the mobile device being configured to alter the content of the display as follows:
when the mobile device is moved from the first position to the second position, the mobile device determines, by the motion detection method, a first change and alters a first content on the display to a second content, and
when the mobile device is moved from the second position back to the first position, the mobile device determines, by the motion detection method, a second change and alters the second content on the display back to the first content.

* * * * *